United States Patent
Ritter et al.

(10) Patent No.: US 7,106,325 B2
(45) Date of Patent: Sep. 12, 2006

(54) SYSTEM AND METHOD FOR RENDERING DIGITAL IMAGES HAVING SURFACE REFLECTANCE PROPERTIES

(75) Inventors: Bradford A. Ritter, Fort Collins, CO (US); Daniel G. Gelb, Redwood City, CA (US); Thomas Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 09/921,681

(22) Filed: Aug. 3, 2001

(65) Prior Publication Data

US 2003/0030639 A1    Feb. 13, 2003

(51) Int. Cl.
*G06T 15/50* (2006.01)

(52) U.S. Cl. .................. 345/426; 345/582; 345/583; 345/584; 345/586

(58) Field of Classification Search ........... 345/419, 345/242, 426, 582, 583, 584, 586
See application file for complete search history.

(56) References Cited

U.S. PATENT DOCUMENTS

| | | | |
|---|---|---|---|
| 5,537,494 A * | 7/1996 | Toh | 382/242 |
| 6,163,319 A * | 12/2000 | Peercy et al. | 345/426 |
| 6,583,790 B1 * | 6/2003 | Wolters | 345/584 |
| 6,654,013 B1 * | 11/2003 | Malzbender et al. | 345/426 |
| 6,697,062 B1 * | 2/2004 | Cabral et al. | 345/419 |
| 6,765,573 B1 * | 7/2004 | Kouadio | 345/426 |
| 6,833,830 B1 * | 12/2004 | Collodi | 345/426 |

OTHER PUBLICATIONS

U.S. Appl. No. 09/527,872 Apparatus for and Method of Enhancing Shape Perception with Parametric Texture Maps, filed Mar. 17, 2000.
U.S. Appl. No. 09/528,700 Apparatus for and Method of Rendering 3D Objects with Parametric Texture Maps, filed Mar. 17, 2000.
"Illumination for Computer Generated Pictures," by Bui Tuong Phong, Communications of the ACM, vol. 18, No. 6, Jun. 1975.
"Measuring and Modeling Anisotropic Reflection," by Gregory J. Ward, Proc. Siggraph Jul. 1992, pp. 265-272.
"A Comprehensive Physical Model for Light Reflection," Xiao D. He et al., Computer Graphics (Siggraph 91 Proceedings), Jul. 28, 1991, pp. 175-186.
"A Model for Anisotropic Reflection," Pierre Poulin et al., Proc. Siggraph, Aug. 1990, pp. 273-282.
"Spherical Wavelets: Efficiently Representing Functions on the Sphere," Peter Schroder et al., Proc. Siggraph, Aug. 1995, pp. 161-172.
"Bidirectional Reflection Distribution Function Expressed in Terms of Surface Scattering Modes," J. Koenderink et al., European Conference on Computer Vision, 1996, pp. 28-39.
"Non-Linear Approximation of Reflectance Functions," Eric P.F. Lafortune et al., Computer Graphics (Proc. Siggraph 97) Aug. 1997, pp. 117-126.

(Continued)

*Primary Examiner*—Kimbinh T. Nguyen

(57) ABSTRACT

According to one embodiment of the present invention, a method for rendering a digital image having surface reflectance properties is disclosed. The method comprises creating a parametric texture map that comprises parameters for an equation that defines a surface structure in a manner in which the appearance of the surface structure includes surface reflectance properties. The method further comprises rendering a digital image using the parametric texture map.

63 Claims, 3 Drawing Sheets

OTHER PUBLICATIONS

"*Bidirectional Reflection Functions from Surface Bump Maps,*" Brian Cabral et al., Computer Graphics (Proc Siggraph '87) Jul. 1987, pp. 273-281.

"*Separating Reflection Functions for Linear Radiosity,*" Alain Fournier, Eurographics Rendering Workshop, Jun. 1995, pp. 383-392.

"*Efficient Rendering of Anisotropic Surfaces Using Computer Graphics Hardware,*" Wolfgang Heidrich et al., Image and Multi-Dimensional DSP Workshop 1998.

"*Interactive Rendering with Arbitrary BRDFs Using Separable Approximations,*" Jan Kautz et al., Computer Graphics Laboratory, Univ. of Waterloo, Waterlook, Ontario, Canada, pp. 1-15.

\* cited by examiner

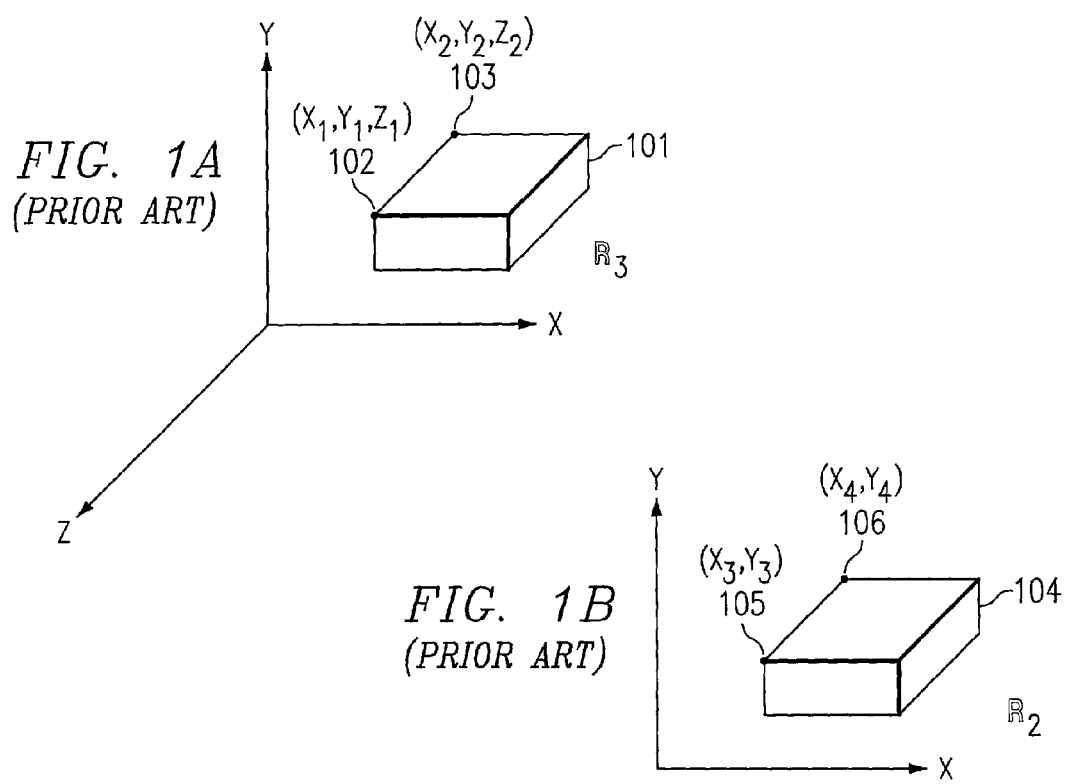
FIG. 1A (PRIOR ART)
FIG. 1B (PRIOR ART)
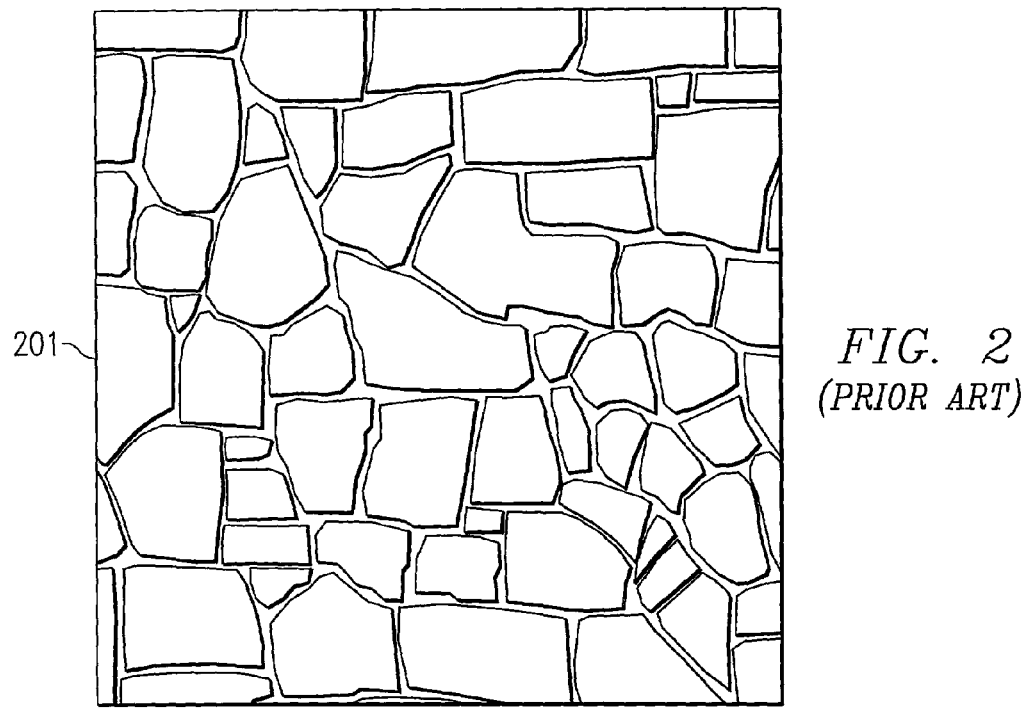
FIG. 2 (PRIOR ART)

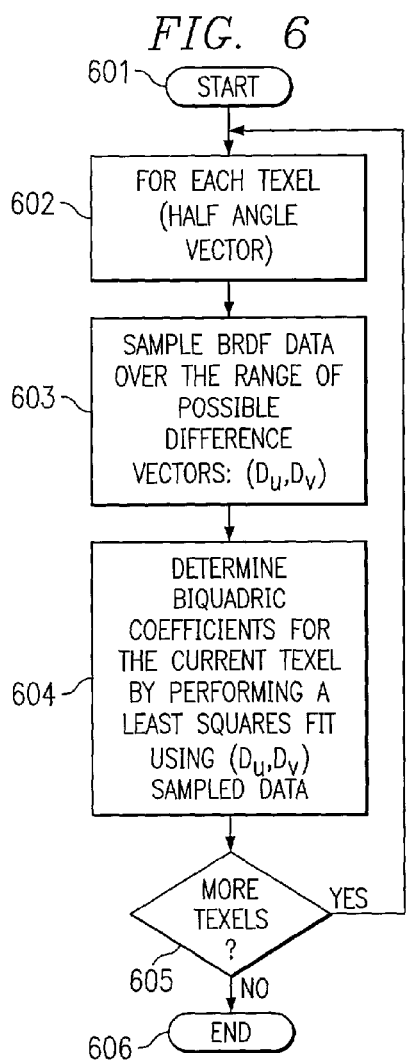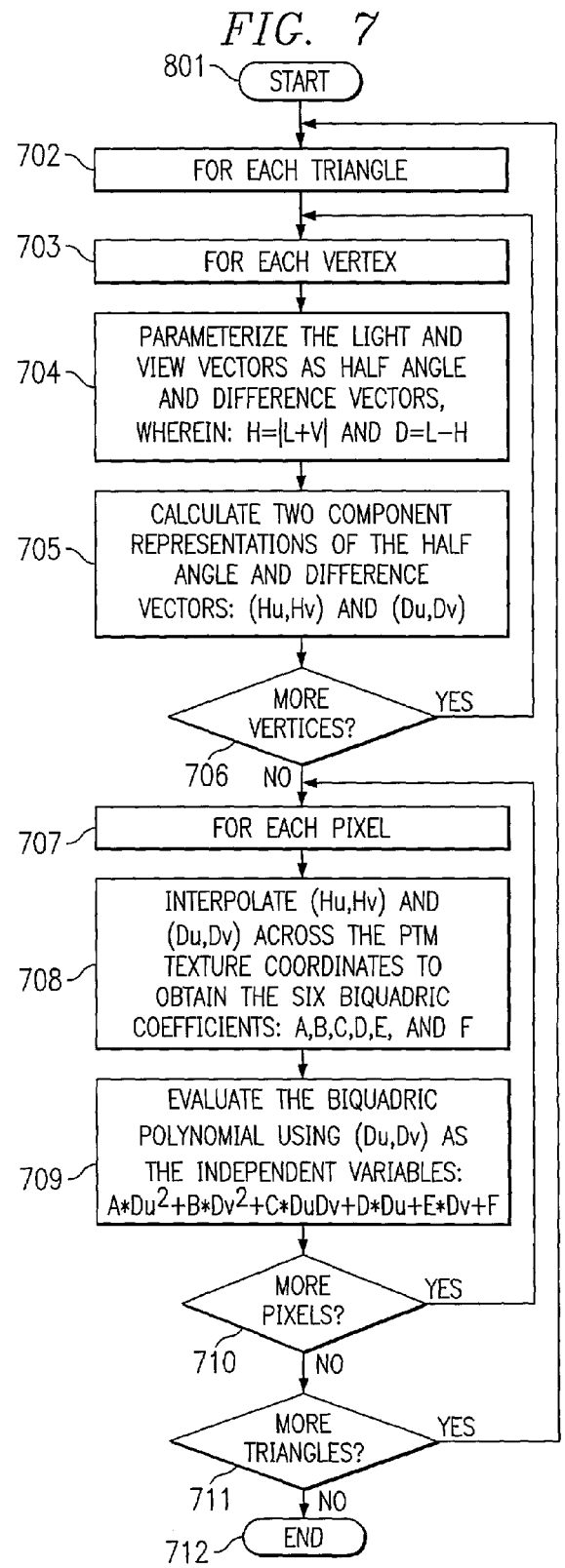

SYSTEM AND METHOD FOR RENDERING DIGITAL IMAGES HAVING SURFACE REFLECTANCE PROPERTIES

RELATED APPLICATIONS

This application is related to co-pending and commonly assigned U.S. patent application Ser. No. 09/528,700 filed Mar. 17, 2000, entitled "APPARATUS FOR AND METHOD OF RENDERING 3D OBJECTS WITH PARAMETRIC TEXTURE MAPS," and co-pending and commonly assigned U.S. patent application Ser. No. 09/527,872 filed Mar. 17, 2000, entitled "APPARATUS FOR AND METHOD OF ENHANCING SHAPE PERCEPTION WITH PARAMETRIC TEXTURE MAPS," the disclosures of which are hereby incorporated herein by reference.

TECHNICAL FIELD

The present invention relates in general to computer-generated graphical images, and more specifically to a system and method for rendering digital images having surface reflectance properties.

BACKGROUND

Computer graphics systems are commonly employed for rendering graphical images. Conventional computer graphics systems commonly include a display device having a two-dimensional (2D) array of light emitting areas. The light emitting areas are usually referred to as "pixels," which is an abbreviation for picture elements. Such a graphics system typically employs hardware, software, or both to generate a 2D array of values that determines the colors or shades of grey that are to be emitted from the corresponding pixels of the display.

Computer graphics systems are commonly employed for the display of three-dimensional (3D) objects. Typically, such a system generates on a 2D display what appears to a viewer to be a 3D object by generating 2D views of the 3D object that is modeled in the computer memory. The 2D view of a 3D object that is generated at a particular time usually depends at least on a spatial relationship between the 3D object and a viewer of the 3D object at the particular time. This spatial relationship may be referred to as the view or eye point direction. For example, a car is a 3D object having a front and a back. However, whether one can see the taillights will depend on the position from which one is viewing the car. A view direction that is directly in front of the car will not show the taillights (but may instead show the headlights), while a view direction that is directly behind the car will show the taillights.

The process by which a computer graphics system generates the values for a 2D view of a 3D object is commonly referred to as image rendering or scan conversion. The graphics system usually renders a 3D object by subdividing the 3D object into a set of polygons and individually rendering each of the polygons. The values for a polygon that are rendered for a particular view direction usually depend on the surface features of the polygon and the effects of the lighting on the polygon. The surface features often include details such as surface colors and surface structures. The effects of lighting usually depend on a spatial relationship between the polygon and one or more light sources. This spatial relationship may be referred to as the light source direction. For example, if there is only one light source, the side of the object closest to the light source will be illuminated while the side of the object furthest from the light source might be in shadow.

Typically, the evaluation of the effects of lighting on an individual pixel in a polygon for a particular view direction involves a number of 3D vector calculations. One of ordinary skill in the art will recognize that the standard Blinn/Phong lighting equation is commonly used in computer graphics for performing lighting calculations for graphical images. Lighting calculations based on the Blinn/Phong equation generally includes floating-point, square-root and divide operations when used with normalized vectors. Such calculations are usually time-consuming and expensive whether performed in hardware or software.

One conventional method for reducing such computational overhead is to evaluate the effects of lighting at just a few areas of a polygon, such as the vertices, and then to interpolate the results across the entire polygon. Examples include methods that are commonly referred to as flat shading and Gouraud shading. Such methods usually reduce the number of calculations that are performed during scan conversion and thereby increase rendering speed. Unfortunately, such methods also usually fail to render shading features that are smaller than the areas of individual polygons. If the polygons are relatively large, the view will be noticeably distorted.

One conventional method for rendering features that are smaller than the area of a polygon is to employ what is referred to as a texture map. In general, a texture refers to a graphics data structure that models the surface appearance of an object. A texture may represent the visual experience of many materials and substances (e.g., terrain, plants, minerals, fur, and skin). Textures may be created digitally by sampling a physical surface utilizing photographic techniques. Alternatively, textures may be created manually utilizing a suitable graphics design application. Texture mapping involves mapping the surface appearance to a graphical surface modeled by a 3D structure. A typical texture map is a table that contains a pattern of color values for a particular surface feature. For example, a wood grain surface feature may be rendered using a surface model and a texture map that holds a color pattern for wood grain.

Texture mapping may be utilized for any number of applications. For example, texture mapping may be utilized by an architectural software application to generate a realistic depiction of a building based upon blueprint designs. For instance, a stucco texture may be wrapped onto a building frame by the architectural software application. Texture mapping may be additionally used to create special effects for movies, video game animation, website wallpapers, and/or the like. Texture mapping is desirable for these applications because it facilitates the representation of an object with an appreciable amount of realism and detail. Moreover, texture mapping may impart 3D qualities to the computer-generated image.

Texture mapping algorithms involve wrapping a texture over the surface of a model. Specifically, a 3D model or data structure of an object is created. For example, FIG. 1A depicts exemplary object 101 in $R_3$ (i.e., 3D real space). The surface of object 101 may be represented as a set of polygons (typically triangles) in 3D space. The polygons are represented by their various vertices. The vertices are defined by coordinates in $R_3$. For example, vertex 102 is defined by $(x_1, Y_1, z_1)$ and vertex 103 is defined by $(x_2, Y_2, Z_2)$ As described above, most computer displays are only capable of displaying a 2D view of such 3D object 101. Accordingly, a mapping function is utilized to map the coordinates in $R_3$ to coordinates in $R_2$ (i.e., 2D real space). Typically, the mapping occurs by defining a view angle. FIG. 1B depicts such a mapping from object 101 of FIG. 1A to object 104. Vertex 102 is mapped to vertex 105 where vertex 105 is defined by two coordinates $(X_3, y_3)$. Likewise, vertex 103 is mapped to vertex 106 where vertex 106 is defined by two coordinates $(x_4, y_4)$. The mapping function allows the data to be represented in a form that may be displayed on a 2D display, such as a computer display.

Concurrently with the mapping, a texture is applied within the confines of the polygons of object 104 to provide a realistic appearance. For example, texture 201 of FIG. 2 may be applied to the polygons of object 104 to create a stone-like appearance. Texture 201 is typically implemented as a matrix of red-green-blue (RGB) values. The RGB values are mapped utilizing a suitable mapping function to the interior of the polygons of object 104. The final graphical image appears to have texture 201 "wrapped" around object 104.

However, this approach is limited as the final graphical image, to an extent, appears flat. Specifically, the graphical image does not appreciably vary in response to a change in illumination direction. Since it does not appreciably change under these conditions, localized shading or occlusions are not evident. Moreover, interreflections due to surface irregularities are not perceived.

Bump mapping is one texture mapping technique that addresses these limitations. Bump mapping involves creating a bump map of displacement values. The displacement values are utilized to perturb the surface normal vector. The perturbed surface normal vector is utilized to render shading in accordance with the Blinn/Phong lighting equation.

Materials, such as those that may comprise the surface of an object, include reflectance properties that define how a source light applied to the material is reflected. Different materials, such as a metal material, wood material, or cloth material, may each have different reflectance properties. As those of ordinary skill in the art will appreciate, the reflectance properties of a surface can be characterized by a Bidirectional Reflectance Distribution Function ("BRDF"), which generally characterizes the color of a surface as a function of incident light and exitant view directions.

In general, BRDF is a function that defines the way a material behaves based on different light directions and different view directions. For example, for an object of a given material (e.g., wood, cloth, metal, etc.), a viewer's perception of the object from a given direction will typically change if the direction at which light is directed toward the surface of such object changes. That is, the material of an object reflects light differently depending on the direction at which the light is directed toward the object, and a viewer typically perceives the object differently depending on the view direction and the direction at which light is directed toward the object. As an example, suppose a viewer is viewing an automobile. The viewer's perception of the metallic surface of the automobile (e.g., the specific color, etc.) generally depends, at least in part, on the direction at which the viewer is viewing the automobile and the direction at which light is directed toward the automobile. For instance, from a given viewing direction, a viewer may have one perception of the automobile's metallic surface with light applied thereto from a first direction (e.g., from a common direction at which the viewer is viewing the automobile), and the viewer may have a different perception of the automobile's metallic surface with light applied thereto from a second direction (e.g., at an angle skewed from the viewer's viewing direction). More specifically, from the viewer's perspective, the light is reflected differently by the automobile's metallic surface when the light is directed toward such surface from different directions. Thus, BRDF provides a further graphical imaging function that may be utilized in generating quality/realistic graphical images.

Accordingly, to render realistic graphical images, it is often desirable to utilize a BRDF. Various techniques have been developed in the prior art for utilizing a BRDF in rendering computer generated graphical images. In general, representations of reflectance functions may be categorized as either 1) parameterized models for specific kinds of BRDFs or 2) general approximation techniques.

The most familiar specialized parametric representation is likely the Phong model, which was one of the first reflectance models developed. See B. -T. Phong. "Illumination for Computer Generated Pictures," *Comm. ACM*, 18(6):311–317, June 1975. Ward has presented a more sophisticated model based on anisotropic Gaussian lobes fitted to various BRDFs. See G. Ward. "Measuring and Modeling Anisotropic Reflection," in *Proc. SIGGRAPH*, pages 265–272, July 1992. Also, He et al. have derived a physical-based model that is based on Kirchhoff diffraction, which also takes wavelength into account. See X. He, K. Torrance, F. Sillion, and D. Greenberg. "A Comprehensive Physical Model for Light Reflection," in *Proc. SIGGRAPH*, pages 175–186, July 1991. As a further example, of a specialized parametric representation, Poulin and Fournier have proposed a model based on self-shadowing of microcylinders. See P. Poulin and A. Fournier. "A Model for Anisotropic Reflection," in *Proc. SIGGRAPH*, pages 273–282, August 1990.

In addition to the techniques categorized as specialized parametric representation, there are many known BRDF approximation techniques. For example, Schröder and Sweldens have represented BRDFs using spherical wavelets. See P. Schröder and W. Sweldens. "Spherical Wavelets: Efficiently Representing Functions on the Sphere," in *Proc. SIGGRAPH* pages 161–172, August 1995. Koenderink et al. have expressed BRDFs in terms of an orthonormal basis using Zemike polynomials. See J. Koenderink, A. van Doom, and M. Stavridi. "Bidirectional Reflection Distribution Function Expressed in Terms of Surface Scattering Modes," in *European Conference on Computer Vision*, pages 28–39, 1996. Lafortune et al. have used an approximation based on the summation of generalized Phong cosine lobes. See E. Lafortune, S. -C. Foo, K. Torrance, and D. Greenberg. "Non-linear Approximation of Reflectance Functions." in *Proc. SIGGRAPH*, pages 117–126, August 1997. Additionally, Cabral et al. teach the use of spherical harmonics to represent BRDFs. See B. Cabral, N. Max, and R. Springmeyer. "Bidirectional Reflection Functions from Surface Bump Maps," in *Proc. SIGGRAPH*, pages 273–281, July 1987. As a further example of a BRDF approximation technique, Fournier used a sum of separable functions for representing reflectance models. See A. Fournier. "Separating Reflection Functions for Linear Radiosity," in *Eurographics Rendering Workshop*, pages 383–392, June 1995.

Existing techniques for rendering of BRDFs have typically been computationally inefficient, thereby resulting in relatively slow rendering of graphical images having reflectance properties. Although, Heidrich and Seidel have proposed a single pass rendering algorithm using texture mapping. See W. Heidrich and H. -P. Seidel. "Efficient Rendering of Anisotropic Surfaces Using Computer Graphics Hardware," in *Image and Multi-dimensional DSP Wordshop (IMDSP)*, 1998. Additionally, Kautz and McCool have taught an interactive rendering technique with arbitrary BRDFs. See J. Kautz and D. McCool. "Interactive Rendering with Arbitrary BRDFs using Separable Approximations," in *Eurographics Rendering Workshop*, 1999, the disclosure of which is hereby incorporated herein by reference. As used herein, "interactive rendering" and "real-time rendering" are synonymous, and both terms refer to a performance metric in terms of frames per second. Interactive rendering implies that the user can interact with the rendering. The opposite (i.e., non-real-time or non-interactive rendering) would be software rendering wherein performance is measured in terms of seconds per frame. With non-interactive rendering, frames are rendered ahead of time in a static order, and the frames are then played back in sequence without the ability to alter the order.

SUMMARY OF THE INVENTION

According to one embodiment of the present invention, a method for rendering a digital image having surface reflectance properties is disclosed. The method comprises creating a parametric texture map that comprises parameters for an equation that defines a surface structure in a manner in which the appearance of the surface structure includes surface reflectance properties. The method further comprises rendering a digital image using the parametric texture map.

BRIEF DESCRIPTION OF THE DRAWING

FIG. 1A depicts an exemplary object in $R_3$ according to the prior art.

FIG. 1B depicts an exemplary mapping of polygons into $R_2$ based on the object depicted in FIG. 1 according to the prior art.

FIG. 2 depicts an exemplary texture according to the prior art.

FIG. 6 shows an exemplary flow diagram for creating a parametric texture map (PTM) for modeling a Bidirectional Reflectance Distribution Function (BRDF) according to at least one embodiment of the present invention.

FIG. 7 shows an exemplary flow diagram for rendering a graphical object using a PTM that defines surface reflectance properties for such object in accordance with at least one embodiment of the present invention.

DETAILED DESCRIPTION

Figure 3:
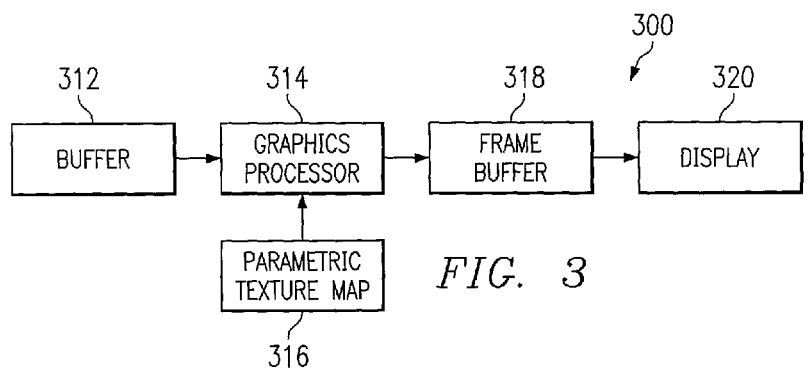
FIG. 3 depicts a block diagram of an exemplary computer graphics system in which embodiments of the present invention may be implemented.

In general, texture mapping has gained much appreciation because of the computational efficiency of many texture mapping techniques in rendering graphical images. That is, many texture mapping techniques are computationally more efficient than non-texture mapping techniques, such as very complex geometry techniques (e.g., using very many tiny triangles) and radiosity (ray-traced lighting algorithms). Thus, because of their computational efficiency, texture mapping techniques may enable graphical images to be rendered much more quickly than non-texture mapping techniques. As described above, bump mapping is one texture mapping technique. More recently, another technique, known as parametric texture mapping ("PTM"), has been developed for performing texture mapping in a manner that renders greater realism than the bump mapping technique.

In general, PTM, which is described further below, is a computer algorithm for rendering objects using a 2D representation of light. PTM provides a desirable graphical rendering technique because it produces quite realistic images based on material properties while employing reasonable computational complexity. Additionally, the PTM algorithm is capable of producing appreciably greater realism for graphical images than many other graphical rendering techniques, such as those employing bump mapping. Thus, it is desirable to use PTM to render graphical images.

Additionally, it is often desirable to render graphical images having surface reflectance properties. That is, including such surface reflectance properties in a rendered graphical image enhances the quality and realism of such image. As is well known in the art, an object's surface reflectance properties may be defined by a BRDF. Accordingly, it is often desirable to utilize a BRDF in rendering graphical images to further improve the realism and quality of such graphical images.

However, BRDFs have traditionally been implemented in a computationally inefficient manner. That is, rendering 3D objects with surface reflectance properties defined by a BRDF has traditionally comprised a highly computationally-intensive process. Accordingly, graphical images having surface reflectance properties defined by a BRDF have traditionally been rendered in a relatively slow manner. For example, 3D objects having surface reflectance properties defined by a BRDF have generally not been rendered in an interactive (or "real-time") manner. While Kautz and McCool, as well as Heidrich and Seidel, have made advances in providing techniques for rendering BRDFs in an efficient manner, existing techniques for rendering graphical objects having surface reflectance properties do not use PTM. It is desirable to provide a technique for rendering graphical objects having surface reflectance properties defined by a BRDF in an efficient manner. It is also desirable to provide a technique for rendering realistic graphical objects having surface reflectance properties and digital images containing such objects, defined by a BRDF.

Embodiments of the present invention address the shortcomings of traditional BRDF techniques by utilizing a PTM function that models BRDF material characteristics. That is, embodiments of the present invention utilize a PTM function to provide a relatively efficient and accurate technique for rendering 3D objects having surface reflectance properties defined by a BRDF that is parameterized within such PTM. For example, various embodiments of the present invention store BRDF data as a PTM in a manner that provides an efficient look-up process for the BRDF data, while minimizing the inaccuracies introduced in the modeling of the BRDF data (to maintain a relatively high quality).

Accordingly, embodiments of the present invention are related to a system and method for utilizing a PTM for rendering a graphical image with surface reflectance properties as defined by a BRDF (which is stored within such PTM). Because in embodiments of the present invention a PTM is adapted to define (or model) a BRDF, an overview of traditional PTMs is provided hereafter. In general, PTM is a computer algorithm for rendering objects using a two-dimensional representation of light. As described further below, the PTM algorithm does not require complex geometric modeling. Instead, optical properties are encoded directly into the texture itself. By placing illumination dependent information into the texture, PTM algorithms are capable of producing enhanced optical effects while reducing computational complexity.

In texture maps, such as a PTM, a texture may be represented as a matrix of discrete components called "texels," which refer to texture elements. Texels may be understood as being analogous to pixels. In a traditional RGB texture, a texel is an RGB component. In PTM, texels generally are more complex data structures which contain lighting information. In a luminance PTM (which is described further below), the data associated with a texel generally comprises six coefficients and an RBG component. In a RBG PTM (which is described further below), the data associated with a texel generally comprises 6 coefficients for each color channel (R, G, B), resulting in a total of 18 coefficients for a texel. The lighting information included in PTMs may be used to reconstruct the surface color under varying light conditions. By encoding lighting information in this manner, PTM textures may permit perception of surface deformations. Additionally, PTM textures may permit perception of self-shadowing and interreflections. PTM textures may also simulate other optical effects such as anisotropic and Frensel shading models.

An overview of using PTMs to render graphical images is further described in conjunction with the exemplary system of FIG. 3. FIG. 3 shows a block diagram of an exemplary computer graphics system 300 according to at least one embodiment of the present invention. Computer graphics system 300 includes buffer 312, graphics processor 314, parametric texture map 316, frame buffer 318, and display 320. Buffer 312 holds geometry data that describes a 3D object that is to be generated on the display 320. Buffer 312 may be any suitable data storage mechanism now known or later discovered, including as examples Random Access Memory (RAM), cache memory, disk drive, floppy disk, and optical disc. The 3D object is represented in the buffer 312 as a set of polygons in a 3D space. In one embodiment, the polygons are triangles and the geometry data in buffer 312 includes the 3D coordinates of the vertices of the triangles.

Computer graphics system 300 includes graphics processor 314, which may be any suitable processor now known or later discovered. Graphics processor 314 reads the parameters that define the polygons from buffer 312 and scan converts each polygon. The scan conversion of a polygon yields a 2D view of the polygon. The 2D view depends on a view direction and light source direction. A 2D view of a polygon includes a color value for each pixel of the polygon that is visible in the plane of display 320. Graphics processor 314 writes the color values for the rendered polygons into frame buffer 318. Frame buffer 314 may be any suitable data storage mechanism, including as examples RAM, cache memory, and disk drive. The color values from frame buffer 318 may be provided to display 320 on a frame by frame basis. Display 320 may be any conventional 2D display device now known or later discovered, such as a scan device or flat-panel display device, as examples.

Parametric texture map 316 may hold parameters that define a surface structure so that the appearance of the surface structure varies with any user-defined vector, such as the view vector, the light source vector, or the half-angle vector, which are described in further detail below. In general, the half-angle vector is a vector that is halfway between the view and light source vectors. Graphics processor 314 maps the surface structure defined in parametric texture map 316 onto the polygons obtained from buffer 312 during scan conversion. The result is a more realistic rendering of 3D features on a surface of a 3D object in comparison to many other texture mapping techniques.

In accordance with various embodiments of the present invention, parametric texture map 316 may comprise surface reflectance properties defined therein. For example, a BRDF defining surface reflectance properties may be parameterized within such PTM 316, which may then be utilized to render graphical objects having surface reflectance properties in an accurate and efficient manner. Thus, according to certain embodiments of the present invention, PTM 316 may comprise one or more PTMs for mapping surface reflectance properties onto a graphical image being rendered. Additionally, in certain embodiments, various other PTM functions may be included within PTM 316, which may be utilized in rendering graphical images. For instance, traditional PTM functions for mapping a surface texture onto a graphical object may be included within PTM 316. Examples of PTM functions that may also be included within PTM 316 include those further described in U.S. patent application Ser. No. 09/528,700, entitled "APPARATUS FOR AND METHOD OF RENDERING 3D OBJECTS WITH PARAMETRIC TEXTURE MAPS" and U.S. patent application Ser. No. 09/527,872, entitled "APPARATUS FOR AND METHOD OF ENHANCING SHAPE PERCEPTION WITH PARAMETRIC TEXTURE MAPS."

TABLE 1 illustrates the general contents of parametric texture map 316. Parametric texture map 316 contains n by m entries (wherein n and m each represent any number). Each of the n by m entries corresponds to a sample of a particular surface modeled by parametric texture map 316. The samples may be referred to herein as "texels," as described above. The coefficients for an individual texel are denoted as $A_{ij}$ to $F_{ij}$, wherein i ranges from one to n and j ranges from one to m.

TABLE 1

| | | | | | | |
|---|---|---|---|---|---|---|
| $A_{1,1}$ | $B_{1,1}$ | $A_{1,2}$ | $B_{1,2}$ | ... | $A_{1,m}$ | $B_{1,m}$ |
| $C_{1,1}$ | $D_{1,1}$ | $C_{1,2}$ | $D_{1,2}$ | | $C_{1,m}$ | $D_{1,m}$ |
| $E_{1,1}$ | $F_{1,1}$ | $E_{1,2}$ | $F_{1,2}$ | | $E_{1,m}$ | $F_{1,m}$ |
| $A_{2,1}$ | $B_{2,1}$ | $A_{2,2}$ | $B_{2,2}$ | ... | $A_{2,m}$ | $B_{2,m}$ |
| $C_{2,1}$ | $D_{2,1}$ | $C_{2,2}$ | $D_{2,2}$ | | $C_{2,m}$ | $D_{2,m}$ |
| $E_{2,1}$ | $F_{2,1}$ | $E_{2,2}$ | $F_{2,2}$ | | $E_{2,m}$ | $F_{2,m}$ |
| . | | . | | | . | |
| . | | . | | | . | |
| . | | . | | | . | |
| $A_{n,1}$ | $B_{n,1}$ | $A_{n,2}$ | $B_{n,2}$ | ... | $A_{n,m}$ | $B_{n,m}$ |
| $C_{n,1}$ | $D_{n,1}$ | $C_{n,2}$ | $D_{n,2}$ | | $C_{n,m}$ | $D_{n,m}$ |
| $E_{n,1}$ | $F_{n,1}$ | $E_{n,2}$ | $F_{n,2}$ | | $E_{n,m}$ | $F_{n,m}$ |

Parametric texture map 316 is representative of a set of parametric texture maps that may be used for rendering 3D objects in graphics system 300. Each parametric texture map according to the present technique is adapted to a particular surface structure that is to be mapped onto a 3D object. In addition, each parametric texture map may be adapted to provide realistic 3D rendering in response to a user-defined vector. For example, parametric texture map 316 may be adapted to provide realistic 3D rendering in response to a varying light source direction for a given fixed view direction. Alternatively, parametric texture map 316 may be adapted to provide realistic 3D rendering in response to a varying view direction for a given fixed light source direction. According to embodiments of the present invention, at least some of the parametric texture maps included within PTM 316 are adapted to define surface reflectance properties (e.g., to model or define a BRDF). More specifically, in certain embodiments, at least some of PTMs 316 are adapted to provide realistic and efficient rendering of 3D graphical objects having surface reflectance properties in response to varying light source directions and varying view directions.

In general, in PTM, each texel may be defined by a biquadric function with six coefficients (A, B, C, D, E, and F, as described above). The texels may be represented by the following form:

$$PTM(u,v)=Au^2+Bv^2+Cuv+Du+Ev+F$$

where u and v represent scalar quantities associated with orthogonal components of a vector. According to one embodiment, u and v are the 2D components of the user-defined vector. For example, u and v may represent the intensity of light from two different directions where the texel is rendered on the 3D object. Specifically, a light source is first determined to be illuminating the 3D object or model. The light source is defined as being positioned at a location relative to the texel being illuminated in the direction defined by an illumination vector, L. Illumination vector, L, is typically a unit vector. Second, surface normal vector, S, is determined, which is the unit vector that is normal to the surface of the 3 D object where the texel is to be applied. Then the projection of L onto the plane defined by S is determined. The projection is represented as two orthogonal vector components on the plane defined by S. The two orthogonal vector components are respectively associated with the scalar values, u and v.

Figure 4:
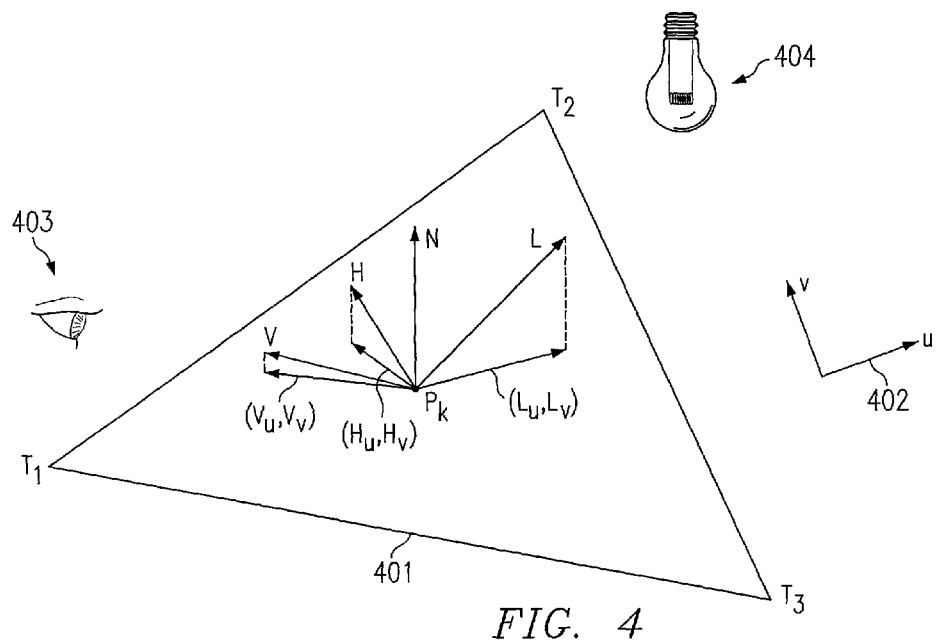
FIG. 4 depicts a graphical representation of a polygon that may be defined in a buffer of FIG. 3 and which is to be rendered by a graphics processor such as that of FIG. 3 using surface features defined by a parametric texture map.

Turning now to FIG. 4, which shows an exemplary graphical representation of polygon 401, which must be defined in buffer 312 of FIG. 3. In the present example, polygon 401 is to be rendered by graphics processor 314 of FIG. 3 using surface features defined by parametric texture map 316. Polygon 401 is defined by a set of three vertices ($T_1$, $T_2$, and $T_3$) in a 3D space. The local coordinate space is represented by a set of u and v axes 402, which are usually defined by the spatial texture coordinates of polygon 401.

A surface normal vector S for polygon 401 is shown, along with an eye point vector (or view vector) V, a light source vector (or illumination vector) L, and a half-angle vector H. As shown, normal vector S is perpendicular to the surface of polygon 401. It should be noted that normal vectors are usually defined for the vertices rather than the entire polygon to improve realism. However, in the example of FIG. 4, a single normal for the polygon is illustrated for simplicity. The eye point vector V represents a view direction from a pixel $P_k$ of polygon 401 to an eye point 403. The light source vector L represents a light source direction from the pixel $P_k$ to a light source 404. The half-angle vector H represents the vector that is halfway between the eye point vector V and the light source vector L.

Also shown is a ($V_u$, $V_v$) vector, which is the eye point vector V projected down into the plane of polygon 401. Likewise, a ($L_u$, $L_v$) vector is included, which is the projection of the light source vector L into the plane of polygon 401, and a ($H_u$, $H_v$) vector is included, which is the projection of the half-angle vector H into the plane of polygon 401.

More specifically, in the plane perpendicular to the normal vector S, a 2D coordinate system exists, which is generally defined by what is commonly known as the tangent and binormal vectors (not shown in FIG. 4). The normal, tangent, and binormal vectors are each perpendicular to the other two and effectively provide a 3D coordinate system. As described further below, in various embodiments of the present invention, PTMs may be parameterized in different ways. For example, a PTM may be parameterized using independent variables for representing light direction (e.g., $L_u$ and $L_v$) and independent variables for representing surface position (e.g., s and t). The surface position may be used to index the texture, e.g., using texture coordinates (s, t). Independent variables for representing the light direction, $L_u$ and $L_v$, may be determined as follows: $L_u$=Dot(light, tangent) and $L_v$=Dot(light, binormal). Thus, independent variable $L_u$ is the dot product of the light and tangent vectors, while variable $L_v$ is the dot product of the light and binormal vectors.

As another example, a PTM may be parameterized using independent variables for representing light direction (e.g., $L_u$ and $L_v$) and independent variables for representing View direction (e.g., $V_u$ and $V_v$). In such case, independent variables for representing the light direction, $L_u$ and $L_v$, may be determined in the manner described above, wherein: $L_u$=Dot(light, tangent) and $L_v$=Dot(light, binormal). Further, independent variables for representing the view direction, $V_u$ and $V_v$, may be determined as follows: $V_u$=Dot(view, tangent) and $V_v$=Dot(view, binormal). Thus, independent variable $V_u$ is the dot product of the view and tangent vectors, while variable $V_v$ is the dot product of the view and binormal vectors. One of the (u, v) pair (e.g., $V_u$ and $V_v$) may be used to index the texture, while the other (u, v) pair (e.g., $L_u$ and $L_v$) may be used to evaluate the PTM function, f(u, v).

As still another example, a PTM may be parameterized using independent variables for representing a half-angle vector (e.g., $H_u$ and $H_v$) and independent variables for representing a difference vector (e.g., $D_u$ and $D_v$). In such case, independent variables for representing the half-angle vector, $H_u$ and $H_v$, may be determined as follows: $H_u$=Dot (half-angle, tangent) and $H_v$=Dot(half-angle, binormal). Further, independent variables for representing the difference vector, $D_u$ and $D_v$, may be determined. More specifically, the difference vector (D) is such that: L=H+D and V=H−D. Thus, $D_u$ is the u component of the projection of the difference vector (D) into the plane defined by the normal vector (N), and $D_v$ is the v component of the projection of the difference vector (D) into the plane defined by the normal vector (N). The (Hu, Hv) pair may be used to index the texture, while the (Du, Dv) pair may be used to evaluate the PTM function, f(u, v).

The coefficients of the texel representation equation, A-F, of the PTM texture may be determined, for example, by repeatedly sampling a surface. For example, a physical stone surface may be digitally photographed a number of times utilizing different illumination angles. The coefficients, A-F, may then be determined from the digital information utilizing a least square approximation. Singular value decomposition (SVD) may be utilized to perform this analysis. Further details regarding implementation of PTM algorithms are disclosed in U.S. patent application Ser. No. 09/528,700, entitled "APPARATUS FOR AND METHOD OF RENDERING 3D OBJECTS WITH PARAMETRIC TEXTURE MAPS" and U.S. patent application Ser. No. 09/527,872, entitled "APPARATUS FOR AND METHOD OF ENHANCING SHAPE PERCEPTION WITH PARAMETRIC TEXTURE MAPS."

Generally, PTM functions may be defined as either RGB PTMs or Luminance PTMs. With RGB PTMs, separate functions are defined for red, green, and blue (RGB) chromatic components or channels. That is, there is a unique biquadric polynomial for each of the three color channels, such as:

$$R = A_R u^2 + B_R v^2 + C_R uv + D_R u + E_R v + F_R$$

$$G = A_G u^2 + B_G v^2 + C_G uv + D_G u + E_G v + F_G$$

$$B = A_B u^2 + B_B v^2 + C_B uv + D_B u + E_B v + F_B$$

wherein a separate function is provided for defining the red (R), green (G), and blue (B) color channels. The separate functions may be used to calculate gray-level intensities of the RGB channels. According to this approach, three separate functions are each evaluated according to u and v as determined by the same surface normal vector, S, and the same illumination vector, L.

In Luminance PTMs, a PTM function is provided that defines the brightness of a texel, while the chromaticity remains constant. That is, for Luminance PTMs one biquadric polynomial is provided that determines a luminance value, which may then be applied to the RGB color channels, such as:

$$L = Au^2 + Bv^2 + Cuv + Du + Ev + F$$

$$R' = R \times L$$

$$G' = G \times L$$

$$B' = B \times L$$

wherein L represents a luminance value that is applied to red (R), green (G), and blue (B) color channels to render realistic color channels R', G', and B' to be used in rendering the graphical image. It may be advantageous to cause the chromaticity to remain independent of u and v, as with Luminance PTMs, because this approach reduces the computational complexity of the algorithm.

A PTM function may comprise four degrees of freedom (or four independent variables). For example, two independent variables ($L_u$, $L_v$) may represent a 2D parameterization of a light position (i.e., represent the light direction), as discussed above, and two independent variables (s, t) may be included within the PTM function as texture coordinates that allow the properties of a 3D object to vary across its surface. That is, a texture may have different characteristics depending on the surface position. For instance, a texture may have a first color at one surface position, and may have another color at a second surface position. For example, a texture may represent a fabric that has a pattern thereon with a first color distributed on certain surface positions and a second color distributed on certain other surface positions. Accordingly, in traditional PTM functions, a texture's surface position may be identified by texture coordinates (s, t), which may be interpolated at each pixel of the 3D object to identify a specific position on the 3D object's surface. Accordingly, a traditional PTM function having four degrees of freedom and six coefficients may be represented as follows:

$$PTM(s,t,L_u,L_v) = A(s,t)L_u^2 + B(s,t)L_v^2 + C(s,t)L_u + E(s,t)L_v + F(s,t).$$

As with the variables u and v described above, $L_u$ and $L_v$ represent scalar quantities associated with orthogonal components of a vector. For example, $L_u$ and $L_v$ may represent the intensity of light from two different directions where the texel is rendered on the three-dimensional object, as described above. And, s and t represent texture coordinates that identify a position on the texture. The result is a 3D object having an appearance that does not vary based on view direction. Such a PTM function having four independent variables may be created as either a RGB or a Luminance type PTM.

It shall be appreciated that PTM provides appreciable advantages over other texture mapping techniques. In particular, PTM does not require modeling the complex geometry associated with bump maps. PTM textures are much more easily constructed from real world samples (e.g., photographs) than bump maps. Moreover, PTM textures provide greater realism than bump maps due to PTM's ability to model complex optical effects. Additionally, PTM textures provide a significantly greater degree of realism than other texture algorithms, while requiring a reasonable level of computational complexity.

As described above, surface reflectance properties, as may be defined by a BRDF, are often a desired characteristic to have included within a graphical object to improve the realism of such graphical object. Various embodiments of the present invention provide an enhancement to traditional BRDFs by enabling such PTM technique to be utilized for rendering graphical objects having surface reflectance properties. More specifically, embodiments of the present invention enable rendering of graphical objects with surface reflectance properties defined by a BRDF using a PTM function. According to at least one embodiment, a BRDF defining surface reflectance properties is re-parameterized within a PTM (such that the PTM models the BRDF). Once the BRDF is re-parameterized as a PTM, the PTM may then be used to effectively look up surface reflectance data (BRDF data) in an efficient manner. Accordingly, the created PTM may be utilized in rendering a graphical image having surface reflectance properties in an efficient manner.

Because in embodiments of the present invention a PTM is adapted to model (or define) a BRDF, an overview of BRDFs is provided hereafter. As those of ordinary skill in the art will appreciate, surface reflectance for a graphical object may be described using a BRDF. In general, BRDF characterizes the color of a surface as a function of incident light and exitant view directions. That is, a BRDF generally provides the ratio of the reflected intensity in the exitant direction to the incident energy per unit area along the incident direction. As those of skill in the art will appreciate, a fully-defined BRDF is a function of view direction (e.g., $V_u$, $V_v$), light direction (e.g., $L_u u$, $L_v$), surface position (e.g., s, t), and light wavelength ($\lambda$).

While a fully-defined BRDF does contain a dependence on wavelength $\lambda$, in practice this parameter is often approximated by independent functions per color channel. That is, the variance over the range of visible wavelengths can be adequately modeled using data for red, green, and blue light components. Thus, the BRDF equation may be defined with the remaining six degrees of freedom: view direction (e.g., $V_u$, $V_v$), light direction (e.g., $L_u$, $L_v$), and surface position (e.g., s, t). An example of an equation for defining BRDF in this manner is: $BRDF(V_u,V_v,L_u,L_v,s,t)$.

For many materials (e.g., textures), the function is constant across all surface positions. That is, for homogeneous materials (e.g., graphical objects having homogeneous surface properties), the BRDF function is constant across all surface positions. One example of such a material that commonly has homogeneous surface properties is automobile paint. Accordingly, a BRDF function for an automobile paint texture (that may be applied to a graphical object representing an automobile) is typically constant across all surface positions of the automobile paint texture. For such homogeneous materials having surface properties that do not vary with surface position, the BRDF may be adequately parameterized (or defined) with only four degrees of freedom. That is, because the BRDF is constant across all surface positions, the two degrees of freedom representing surface position (e.g., s, t) may be neglected, resulting in the BRDF being defined with the four remaining degrees of freedom.

An example of an equation for defining BRDF in this manner is: $BRDF(V_u, V_v, L_u, L_v)$.

BRDF functions, including those defined with four degrees of freedom, are further described by Kautz and McCool in "Interactive Rendering with Arbitrary BRDFs using Separable Approximations" in *Eurographics Rendering Workshop*, 1999.

According to at least one embodiment of the present invention, a PTM function may be defined that is restricted to representing material properties that do not vary across the surface of an object (i.e., homogeneous materials), which allows two variables within the PTM to represent the view direction, rather than surface position. That is, by restricting the material properties so that they do not vary across the surface of an object, the texture coordinates s and t traditionally used in a PTM function to identify the surface position are unneeded, thereby enabling such variables to be replaced with variables $V_u$ and $V_v$ that define the view direction for a BRDF. Accordingly, the two degrees of freedom for defining the light direction for a BRDF are available in a PTM function (as variables $L_u$ and $L_v$), and for homogeneous surfaces, the two degrees of freedom for defining the view direction for a BRDF are available in a PTM function (as variables $V_u$ and $V_v$). Thus, in a first derivation, the traditional PTM function having four independent variables adapted for modeling a BRDF for a homogeneous surface becomes:

$$PTM(L_u,L_v,V_u,V_v)=A(V_u,V_v)L_u^2+B(V_u,V_v)L_v^2+C(V_u,V_v)L_uL_v+D(V_u,V_v)L_u+E(V_u,V_v)L_v+F(V_u,V_v),$$

wherein $L_u$ and $L_v$ may represent the intensity of light from two different directions for the BRDF and $V_u$ and $V_v$ may represent the view direction for the BRDF. The result is a 3D object having an appearance that may vary based on light direction and view direction.

It may further be desirable to reparameterize the light and view vectors in terms of half-angle and difference vectors. For instance, reparameterizing the light/view directions in terms of a half-angle vector and difference vector provides advantages for materials with high specular characteristics, such as automobile paints. In general, the half-angle/difference parameterization has the effect of creating a greater separation between diffuse and specular characteristics. Generally, diffuse characteristics may be expressed in 2D with a wide and low (or flat) curve, while specular characteristics may be expressed with a narrow and high (or tall) curve.

Figure 5:
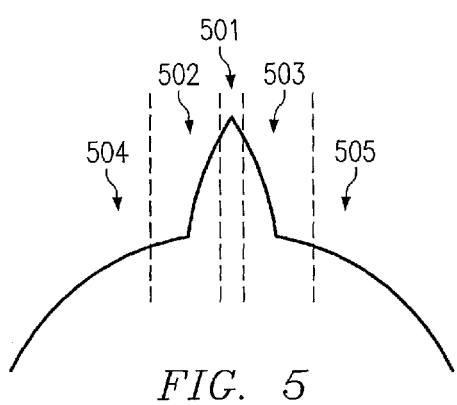
FIG. 5 shows an exemplary 2D plot of a half-angle vector function.

As an example, FIG. 5 shows an exemplary 2D plot of a half-angle vector function. Generally, there exists a family of curves, such as that shown in FIG. 5, for a range of difference vectors. The very center section of the plot, section 501 in the example of FIG. 5, is dominated by specular characteristics. The sections just to the left and just to the right of center, shown as sections 502 and 503 in the example of FIG. 5, are dominated by specular characteristics for certain difference vectors and are dominated by diffuse characteristics for other difference vectors. The sections at the extreme left and right portions of the plot, shown as sections 504 and 505 in the example of FIG. 5, are dominated by diffuse characteristics. Thus, the use of a half-angle/difference vector parameterization enables for greater separation of diffuse and specular characteristics for a material.

Generally, a PTM function is a biquadric polynomial, which in 3-dimensions plots roughly to the shape of a bowl or mound. Such a PTM function may be used to accurately model either the specular curve or the diffuse curve, but is generally inaccurate at modeling both at once. Thus, the above-described Light/View parameterization of a PTM according to the present invention is generally good for modeling materials without significant specular characteristics. That is, it may not be necessary to parameterize the PTM in a manner in which the specular and diffuse characteristics are separated when the material being modeled does not have significant specular characteristics. For materials having significant specular characteristics, the half-angle/difference vector parameterization is preferably used in the PTM to model such materials having significant specular characteristics. In this manner, the specular and diffuse characteristics may be separated such that the specular characteristics may be used by the PTM for modeling the material.

The well-known Gram-Schmidt half-angle vector parameterization is one technique for parameterizing a BRDF as half-angle and difference vectors. Such Gram-Schmidt parameterization or any other suitable technique now known or later developed for parameterizing a BRDF as half-angle and difference vectors may be used in embodiments of the present invention. In general, the half-angle (H) is defined as: H=|L+V|. The difference vector (D) is such that: L=H+D and V=H−D. Accordingly, given the light vector (L) and view vector (V), it is possible to derive the half-angle (H) and difference vector (D). Likewise, given the half-angle (H) and difference vector (D), it is possible to derive the light vector (L) and view vector (V). Re-parameterizing the BRDF in terms of such a half-angle vector and difference vector is further described by Kautz and McCool in "Interactive Rendering with Arbitrary BRDFs using Separable Approximations" in *Eurographics Rendering Workshop*, 1999.

Accordingly, after reparameterizing the light and view vectors as half-angle and difference vectors in the manner described above, a further derivation of the PTM function becomes:

$$PTM(D_u,D_v,H_u,H_v)=A(H_u,H_v)D_u^2+B(H_u,H_v)D_v^2+C(H_u,H_v)D_u+E(H_u,H_v)D_v+F(H_u,H_v).$$

The result is a 3D object having an appearance that may vary based on light direction and view direction, wherein the material being modeled may include significant specular characteristics.

Turning now to FIG. 6, an exemplary flow diagram for creating a PTM for modeling a BRDF according to at least one embodiment of the present invention is shown. Such flow diagram may be implemented within software, hardware, or both. As shown, operation starts in operational block 601, and a "for" loop is entered in block 602. That is, at block 602 the process begins looping through each of the texels (or half-angle vectors). In block 603, BRDF data is sampled for each texel over the range of possible difference vectors ($D_u$, $D_v$). In block 604, the biquadric coefficients (e.g., coefficients A-F) are determined for the current texel. For example, such coefficients may be determined by performing a least squares fit using the ($D_u$, $D_v$) sampled data obtained in operational block 603. In block 605, it is determined whether more texels exist. If more texels do exist, then operation returns to block 602 to again loop through operational blocks 603 and 604 for the next texel. Once it is determined at block 605 that no further texels exist, operation may end in block 606.

Turning now to FIG. 7, an exemplary flow diagram for rendering a graphical object using a PTM that defines surface reflectance properties for such object in accordance with at least one embodiment of the present invention is shown. For example, such a PTM may have been created for modeling a BRDF in accordance with the exemplary operational flow described above in conjunction with FIG. 6. The exemplary flow diagram of FIG. 7 may be implemented within software, hardware, or both that models a BRDF with a PTM in rendering a graphical object with surface reflectance properties. As shown, operation starts in operational block 701, and a "for" loop is entered in block 702. That is, at block 702 the process begins looping through each of the polygons (e.g., triangles) included within an object to be rendered. For each of the triangles of an object, a further "for" loop is entered in block 703, which loops through each vertex of the triangle. It will be understood by one of ordinary skill in the art that other polygonal shapes having any number of vertices may be used.

For each vertex, operational block 704 is performed, wherein the light (L) and view (V) vectors are parameterized as half-angle (H) and difference (D) vectors, such that H=|L+V| and D=L−H, as described above. Thereafter, the two component representations of the half-angle (H) and difference (D) vectors are calculated, e.g., ($H_u$, $H_v$) and ($D_u$, $D_v$) as described above. In block 706, it is determined whether more vertices exist for the triangle. If more vertices do exist, then operation returns to block 703 to again loop through operational blocks 704 and 705 for the next vertex of the triangle. Once it is determined at block 706 that no further vertices exist, operation advances to block 707.

At operational block 707, a "for" loop is entered, wherein the process begins looping through each pixel of the object. For each pixel, at block 708, the two component representations of the half-angle (H) and difference (D) vectors, ($H_u$, $H_v$) and ($D_u$, $D_v$), are interpolated across the PTM texture coordinates to obtain the six biquadric coefficients (e.g., coefficients A-F). In block 709, the biquadric polynomial is evaluated using the component representation of the half-angle vector (H), ($H_u$, $H_v$), effectively as texture coordinates for indexing the PTM texture. The component representation of the difference vector (D), ($D_u$, $D_v$), is used as independent variables for the indexed PTM texture (as determined by $H_u$, $H_v$), such that: Pixel=A($D_u^2$)+B($D_v^2$)+C($D_u D_v$)+D($D_u$)+E($D_v$)+F, wherein the Pixel is determined by the index ($H_u$, $H_v$). In other words, a PTM function for modeling a BRDF is evaluated at block 709, wherein such PTM function takes the form:

$$PTM(D_u, D_v, H_u, H_v) = A(H_u, H_v)D_u^2 + B(H_u, H_v)D_v^2 + C(H_u, H_v)D_u D_v + D(H_u, H_v)D_u + E(H_u, H_v)D_v + F$$

wherein variables $H_u$ and $H_v$ are used for indexing the PTM texture.

At block 710, it is determined whether more pixels exist for the triangle. If more pixels do exist, then operation returns to block 707 to again loop through operational blocks 708 and 709 for the next pixel. Once it is determined at block 710 that no further pixels exist, operation advances to block 711, where it is determined whether more triangles exist for the object. If more triangles do exist, then operation returns to block 702 to again loop through the above operation for the next triangle. Once it is determined at block 711 that no further triangles exist, operation ends at block 712.

In view of the above, an efficient and accurate technique is provided for rendering graphical images having surface reflectance properties. More specifically, a PTM is used to model a BRDF, and such PTM may be used to render graphical images having surface reflectance properties as defined by the BRDF being modeled by such PTM. According to at least one embodiment, the PTM is implemented with four independent variables, which are used for defining the BRDF. For example, in one implementation, such four independent variables may be used to define light direction parameters ($L_u$, $L_v$) and view direction parameters ($V_u$, $V_v$). In other implementations, such four independent variables may be re-parameterized to define a half-angle vector ($H_u$, $H_v$) and difference vector ($D_u$, $D_v$). Preferably, the PTMs are used in accordance with embodiments of the present invention to model a BRDF for an object having homogeneous surface properties (e.g., consistent color across its surface). Because the surface properties do not vary for such objects, the texture coordinates (s, t) that are traditionally included within PTMs for specifying surface position may be replaced with independent variables for use in defining a BRDF (e.g., replaced with independent variables $V_u$ and $V_v$ representing the view direction).

By using PTMs to model BRDFs, BRDF data may be obtained in a very efficient manner. For instance, in a preferred embodiment, PTMs are used to model BRDFs such that graphical images having surface reflectance properties may be rendered in real-time. Furthermore, specialized hardware is not required to implement embodiments of the present invention, but rather existing graphics rendering hardware may be utilized to implement embodiments of the invention for rendering high quality graphical images that include surface reflectance properties. A preferred embodiment uses PTMs to model BRDFs such that graphical images including surface reflectance properties may be rendered in real-time using existing graphics rendering hardware. Additionally, the quality of the result may be improved as the precision of the hardware is improved. In other words, the quality of the result is limited by existing graphics rendering hardware and not by the PTM algorithm. Using a PTM to model a BRDF in accordance with embodiments of the present invention provides a more efficient approach for modeling a BRDF with existing graphics rendering hardware than is available through traditional approaches for modeling BRDF properties.

PTMs according to embodiments of the present invention may have many applications. In an exemplary application, and not by way of limitation, such PTMs may be used for rendering graphical images of automobiles having surface reflectance properties, as automobiles commonly have homogeneous surface properties (e.g., a consistent paint color across the body of an automobile). Of course, many other applications are possible and are intended to be within the scope of the present invention.

Various embodiments of the present invention may be implemented within a system such as exemplary system 300 of FIG. 3. For example, PTMs modeling BRDFs may be stored as PTM 316, and processor 314 may be implemented to execute various logical instructions according to embodiments of the present invention. For instance, processor 314 may execute machine-level instructions according to the exemplary operational flows described above in conjunction with FIGS. 6 and 7.

Additionally, while various embodiments have been described above for modeling BRDFs with PTMs for materials having a homogeneous surface, other embodiments may enable PTMs to be used for modeling BRDFs for non-homogeneous materials. For instance, as described above, PTMs having four independent variables may be used for modeling BRDFs for materials having a homogeneous surface. In certain embodiments, PTMs having six (or more) independent variables may be created for modeling BRDFs, which may allow for modeling of BRDF data for non-homogeneous materials. For example, a PTM may be created that comprises two independent variables representing the light direction and two independent variables representing the view direction (as described above), and the PTM may further comprise two independent variables that represent a surface position on a texture (e.g., texture coordinates s and t). Accordingly, such PTMs implemented with six independent variables may allow for modeling of BRDF data for materials that do not have a non-homogeneous surface. However, such an increase in the number of independent variables included within a PTM increases the amount of processing required for executing the PTM. Thus, the necessary processing power for efficiently executing PTMs having more than four independent variables may not be commonly available in systems in which a PTM is desired to be used for rendering graphical images. Of course, where hardware technology is available that is capable of efficiently executing PTMs having more than four independent variables, such PTMs may be used for modeling BRDF data for materials having homogeneous or non-homogeneous surfaces.

What is claimed is:

1. A method for rendering a digital image having surface reflectance properties, said method comprising the steps of:
   creating a parametric texture map that comprises parameters for an equation that defines a homogeneous surface structure in a manner in which the appearance of the surface structure includes surface reflectance properties, wherein said parametric texture map does not include variables representing surface position; and
   rendering a digital image using said parametric texture map.

2. The method of claim 1 wherein said creating step further comprises:
   creating said parametric texture map such that it models a surface reflectance function defining said surface reflectance properties of said surface structure.

3. The method of claim 1 wherein said surface reflectance properties vary in response to a light direction vector and a view direction vector.

4. The method of claim 1 wherein said parametric texture map comprises at least four independent variables.

5. The method of claim 1 wherein said parametric texture map comprises at least two independent variables for defining a light direction vector for said surface reflectance properties.

6. The method of claim 1 wherein said parametric texture map comprises at least two independent variables for defining a view direction vector for said surface reflectance properties.

7. The method of claim 1 wherein said parametric texture map comprises a plurality of texels and wherein said parametric texture map further comprises a plurality of coefficients for each texel, said plurality of coefficients defining lighting characteristics for varying views of the respective texel.

8. The method of claim 1 wherein said parametric texture map comprises at least two independent variables for defining a half-angle vector for said surface reflectance properties.

9. The method of claim 1 wherein said parametric texture map comprises at least two independent variables for defining a difference vector for said surface reflectance properties.

10. The method of claim 1 wherein said equation models a Bidirectional Reflectance Distribution Function (BRDF).

11. The method of claim 1 wherein said parametric texture map defines said surface structure according to one selected from the group consisting of:
   $PTM(V_u, V_v, l_u, l_v) = A(V_u, V_v) l_u^2 + B(V_u, V_v) l_v^2 + C(V_u, V_v) l_u l_v + D(V_u, V_v) l_u + E(V_u, V_v) l_v + F(V_u, V_v)$, wherein, B, C, D, B, and F are coefficients, $V_v$ and $V_v$ are variables representing view direction, and $l_u$ and $l_v$ are variables representing light direction, and
   $PTM(H_u, H_v, D_u, D_v) = A(H_u, H_v) D_u^2 = B(H_u, H_v) D_v^2 + C(H_u, H_v) D_u D_v + D(H_u, H_v) D_u + E(H_u, H_v) D_v + F(H_u, H_v)$,
   wherein, B, C, D, B, and F are coefficients, $H_u$ and $H_v$ are variables representing a half-angle vector, and $D_u$ and $D_v$ are variables representing a difference vector.

12. A method for creating a parametric texture map for modeling surface reflectance properties for use in rendering a digital image having said surface reflectance properties, said method comprising the steps of:
   for each texel of a texture, sampling surface reflectance data for a homogeneous surface and determining at least one coefficient of said parametric texture map based at least in part on the sampled surface reflectance data; and
   creating said parametric texture map, wherein said parametric texture map determines values for pixels of said digital image using an equation that is not a function of said pixels' surface positions.

13. The method of claim 12 wherein said determining step comprises:
   determining six coefficients of said parametric texture map based at least in part on the sampled surface reflectance data.

14. The method of claim 12 wherein said parametric texture map comprises at least four independent variables.

15. The method of claim 12 wherein said parametric texture map comprises at least two independent variables for defining a light direction vector for said surface reflectance properties.

16. The method of claim 12 wherein said parametric texture map comprises at least two independent variables for defining a view direction vector for said surface reflectance properties.

17. The method of claim 12 wherein said parametric texture map comprises at least two independent variables for defining a half-angle vector for said surface reflectance properties.

18. The method of claim 12 wherein said parametric texture map comprises at least two independent variables for defining a difference vector for said surface reflectance properties.

19. The method of claim 12 wherein said step of determining further comprises:
   performing a least squares fit algorithm to the sampled surface reflectance data.

20. A computer graphics system including a graphics processor and display, the system comprising:
   a parametric texture map executable by said graphics processor, wherein said parametric texture map models a surface reflectance function defining surface reflectance properties for a homogeneous surface structure, and wherein said surface reflectance function comprises a Bidirectional Reflectance Distribution Function (BRDF).

21. The system of claim 20, wherein said parametric texture map comprises four independent variables.

22. The system of claim 21, wherein said parametric texture map comprises at least two independent variables for defining a light direction vector for said surface reflectance function.

23. The system of claim 20 wherein said parametric texture map comprises at least two independent variables for defining a view direction vector for said surface reflectance function.

24. The system of claim 20 wherein said parametric texture map comprises at least two independent variables for defining a half-angle vector for said surface reflectance function.

25. The system of claim 20 wherein said parametric texture map comprises at least two independent variables for defining a difference vector for said surface reflectance function.

26. The system of claim 20 wherein said parametric texture map is executable by said graphics processor to render said surface structure having surface reflectance properties defined by said surface reflectance function in substantially real-time.

27. The system of claim 20 wherein said parametric texture map does not include variables representing surface position.

28. A system for rendering a digital image utilizing a texture map, said system comprising:
a texture map data structure including a function for representing a texture map of a plurality of texels, said function evaluating at least two independent variables for defining an illumination vector and at least two independent variables for defining a view vector.

29. The system of claim 28 wherein said texture map data structure models a surface reflectance function for a surface structure.

30. The system of claim 28 wherein said surface structure is a homogeneous surface structure, and wherein said function does not include variables representing surface position.

31. The system of claim 28 wherein said texture map data structure further comprises a plurality of coefficients for each texel of said texture map, said plurality of coefficients defining lighting characteristics for varying views of each respective texel.

32. The system of claim 28 further comprising:
a rendering algorithm, said rendering algorithm being operable to calculate texel display value using said texture map data structure.

33. The system of claim 32 wherein said rendering algorithm is operable to render a 3D object having surface reflectance properties as defined by said texture map data structure.

34. A system for rendering a digital image utilizing a texture map, said system comprising:
a texture map data structure including a function for representing a texture map of a plurality of texels, said function evaluating at least two independent variables for defining a half-angle vector and at least two independent variables for defining a difference vector.

35. The system of claim 34 wherein said texture map data structure models a surface reflectance function for a surface structure.

36. The system of claim 35 wherein said surface structure is a homogeneous surface structure, and wherein said function does not include variables representing surface position.

37. The system of claim 34 further comprising:
a rendering algorithm, said rendering algorithm being operable to calculate texel display value using said texture map data structure.

38. The system of claim 37 wherein said rendering algorithm is operable to render a 3D object having surface reflectance properties as defined by said texture map data structure.

39. A method comprising:
using a texture map that includes a function for use in rendering a digital image having surface reflectance properties, wherein said function evaluates more than two variables directed to surface reflectance properties.

40. The method of claim 39 wherein said function evaluates at least two independent variables for defining an illumination vector and at least two independent variables for defining a view vector.

41. The method of claim 39 wherein said function evaluates at least two independent variables for defining a half-angle vector and at least two independent variables for defining a difference vector.

42. The system of claim 39 wherein said digital image comprises a homogeneous surface structure, and wherein said function does not include variables representing surface position.

43. A system comprising:
a texture map that includes a function for use in rendering a digital image, wherein said function evaluates more than two variables relating to surface reflectance properties of said digital image.

44. The system of claim 43 wherein said function evaluates at least two independent variables for defining an illumination vector and at least two independent variables for defining a view vector.

45. The system of claim 43 wherein said function evaluates at least two independent variables for defining a half-angle vector and at least two independent variables for defining a difference vector.

46. The system of claim 39 wherein said digital image comprises a homogeneous surface structure, and wherein said function does not include variables representing surface position.

47. A method comprising:
receiving more than two independent variables relating to surface reflectance properties of a digital image to be rendered; and
using a function of a texture map for processing the received variables to render the digital image having surface reflectance properties in accordance with the received variables.

48. The method of claim 47 wherein said using said function comprises:
said function evaluating at least two independent variables for defining an illumination vector and at least two independent variables for defining a view vector.

49. The method of claim 47 wherein said using said function comprises:
said function evaluating at least two independent variables for defining a half-angle vector and at least two independent variables for defining a difference vector.

50. The system of claim 47 wherein said digital image comprises a homogeneous surface structure, and wherein said function does not include variables representing surface position.

51. A system comprising:
- a texture map that includes a Bidirectional Reflectance Distribution Function (BRDF) for use in rendering a digital image, wherein said BRDF includes more than two variables relating to surface reflectance properties of said digital image.

52. The system of claim 51 wherein said more than two variables are selected from the group consisting of:
- variables for defining an illumination vector, variables for defining a view vector, variables for defining a half-angle vector, and variables for defining a difference vector.

53. The system of claim 51 wherein said more than two variables includes at least two independent variables for defining an illumination vector and at least two independent variables for defining a view vector.

54. The system of claim 51 wherein said more than two variables includes at least two independent variables for defining a half-angle vector and at least two independent variables for defining a difference vector.

55. The system of claim 51 wherein said digital image comprises a homogeneous surface structure, and wherein said BRDF does not include variables representing surface position.

56. Computer-executable software code stored to a computer-readable medium, said computer-executable software code comprising:
- code for receiving at least four independent surface reflectance property variables; and
- code for using a function included in a texture map for rendering a digital image, wherein said function evaluates the received at least four independent surface reflectance property variables to render said digital image having proper surface reflectance properties.

57. The computer-executable software code of claim 56 wherein said at least four independent surface reflectance property variables comprise:
- at least two independent variables for defining an illumination vector; and
- at least two independent variables for defining a view vector.

58. The computer-executable software code of claim 56 wherein said at least four independent surface reflectance property variables comprise:
- at least two independent variables for defining a half-angle vector; and
- at least two independent variables for defining a difference vector.

59. The computer-executable software code of claim 56 wherein said digital image comprises a homogeneous surface structure, and wherein said function does not include variables representing surface position.

60. A method for rendering a digital image having surface reflectance properties, said method comprising:
- creating a parametric texture map that comprises parameters for an equation that defines a surface structure in a manner in which the appearance of the surface structure includes surface reflectance properties, wherein said equation models a Bidirectional Reflectance Distribution Function (BRDF); and
- rendering a digital image using said parametric texture map.

61. The method of claim 60 wherein said surface structure is a homogeneous surface structure, and wherein said equation does not include variables representing surface position.

62. A method for creating a parametric texture map for modeling surface reflectance properties for use in rendering a digital image having said surface reflectance properties, said method comprising:
- for each texel of a texture, sampling surface reflectance data and determining at least one coefficient of said parametric texture map based at least in part on the sampled surface reflectance data, wherein said step of determining further comprises performing a least squares fit algorithm to the sampled surface reflectance data.

63. The method of claim 62 wherein said digital image comprises a homogeneous surface structure; wherein said parametric texture map comprises a function for modeling said surface reflectance properties; and wherein said function does not include variables representing surface position.

* * * * *